United States Patent
Lamberton et al.

(10) Patent No.: US 6,792,463 B1
(45) Date of Patent: Sep. 14, 2004

(54) SYSTEM, METHOD AND PROGRAM PRODUCT FOR PROVIDING INVISIBILITY TO A PROXY-SERVER

(75) Inventors: Marc Lamberton, Antibes (FR); Eric Levy-Abegnoli, Nice (FR); Pascal Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 09/693,088

(22) Filed: Oct. 20, 2000

(30) Foreign Application Priority Data

Oct. 21, 1999 (EP) .............................................. 99480109

(51) Int. Cl.⁷ .............................................. G06F 15/16
(52) U.S. Cl. ........................ 709/227; 709/203; 709/218
(58) Field of Search .................. 709/203, 217–219, 709/224, 202, 245, 227

(56) References Cited

U.S. PATENT DOCUMENTS

| | | | | |
|---|---|---|---|---|
| 5,850,517 A | * | 12/1998 | Verkler et al. .............. | 709/202 |
| 5,918,018 A | * | 6/1999 | Gooderum et al. ......... | 709/225 |
| 6,154,775 A | * | 11/2000 | Coss et al. .................. | 709/225 |
| 6,182,141 B1 | * | 1/2001 | Blum et al. ................. | 709/227 |
| 6,330,602 B1 | * | 12/2001 | Law et al. ................... | 709/224 |
| 6,389,462 B1 | * | 5/2002 | Cohen et al. ............... | 709/218 |
| 6,401,125 B1 | * | 6/2002 | Makarios et al. .......... | 709/229 |
| 6,421,733 B1 | * | 7/2002 | Tso et al. ................... | 709/246 |
| 6,473,406 B1 | * | 10/2002 | Coile et al. ................. | 370/248 |
| 6,490,615 B1 | * | 12/2002 | Dias et al. .................. | 709/219 |

* cited by examiner

Primary Examiner—Patrice Winder
Assistant Examiner—David Lazaro
(74) Attorney, Agent, or Firm—John E. Campbell; Floyd A. Gonzalez

(57) ABSTRACT

A method is disclosed for providing "invisibility" to the compulsory gateway of an IP network, comprising a clustered proxy-server including an inverse load balancer. When individual servers have to access, transparently, resources available on remote content-servers on behalf of a user, an inverse load balancer keeps track of which individual server is in charge of the user request and steers the response through the cluster to the user.

31 Claims, 3 Drawing Sheets

PRIOR ART

SYSTEM, METHOD AND PROGRAM PRODUCT FOR PROVIDING INVISIBILITY TO A PROXY-SERVER

FIELD OF THE INVENTION

The present invention relates to the Internet and more particularly applies to gateways and proxies used by Internet Service Providers (ISPs) and enterprise networks administrators at the boundary of their networks.

BACKGROUND OF THE INVENTION

The Internet is actually a worldwide IP network that links many different organizations. The Internet is not a centralized organization but a collection of different networks from various sources, governmental, educational and commercial. Internet routing is done by many Internet providers, government departments and private service companies who establish connections among themselves and build the base of the network. Organizations and individuals connected to the Internet are usually bound to one provider and so may communicate with any other connected organization and individual across the inter-provider routes that are made of expensive communications lines often referred to as 'peer lines'.

To cope with the explosion of the Internet over the past years, a rapid expansion in bandwidth and other resources deployed by the ISPs was required. Then, to contain their operational costs, ISPs and administrators of enterprise networks have largely used proxy caching which can significantly reduce bandwidth costs by retaining, locally, highly used information rather than accessing it from a remote content-server, through an expensive link (i.e., long-distance and sometimes transatlantic lines), each time it is requested by an end-user (ISP's customers and users). The caching proxy function is also beneficial to the end-user who may thus enjoy good response time. The function is carried out by a proxy-server which is a Web server that takes over the responsibility of retrieving Internet data for multiple browser clients. Client requests are sent to the servers through the proxy server. Typically, European ISPs have their network built around this scheme. They have installed cache farms in Europe to better serve Web pages from the local cache farms rather than retrieving the pages from US content-server since it is observed that a very high percentage of the requested Web pages in Europe (up to 9 out 10) are hosted in servers located in the USA.

However, the use of proxy-servers does not go without posing its own set of problems. A first example of the problems created by the use of a proxy-server is when each user interface (i.e., client browsers) needs to be explicitly configured to recognize the proxy at the gateway of a network. This becomes rapidly an administration nightmare when proxy-servers are moved, or when proxy-server farms need to grow since all user interface need to be reconfigured. This also introduces a flaw in the main objective of such a deployment. Some users, sometimes many, which are well aware of the advantages and disadvantages of using a proxy-server on their way to the content-server, purposely disable the default proxy-server setup on their system by the network administrator. As a consequence the proxy server becomes less efficient since it handles only part of the traffic and the statistical benefit expected from the use of a proxy-server may be highly impaired by the numerous users attempting to bypass it.

However, solutions to this first type of problem have been brought by implementing "transparent proxying" techniques which do not require that each user be explicitly configured to recognize a proxy. A transparent proxy manages to catch anyway all outbound traffic irrespective of the end user attempts to bypass it. A discussion on this and more can be found in a publication by the International Technical Support Organization of IBM Corporation, P.O. Box 12195, Research Triangle Park, N.C. 27709 U.S.A, under the title 'Web Caching and Filtering with IBM Websphere Performance Pack', dated March 1999.

A second type of problems encountered when using proxy-servers occurs on the path from the proxy-server to the content-server when the proxy-server is not able to provide the requested service e.g., because it does not have the requested Web page yet. In such a case, a proxy-server normally issues a request to the content-server with its own identification, utilizing its own IP address. However, prior to the installation of a proxy-server by an ISP or an enterprise network manager, some specialized hardware and software may have preexisted that were performing filtering and shaping function between clients and content-servers and more likely in front of the most expensive lines. This, in an attempt to regulate the traffic and prevent some users or some group of users from over-utilizing network resources (i.e., bandwidth) beyond what has been negotiated. Thus, the insertion of proxy-servers between clients and content-servers, which hides the identification of the actual users, does not permit those shaping and filtering functions to operate properly since their algorithms were essentially based on the real addresses of the users having issued the requests.

This second type of problems is solved in new proxy-servers that are capable of issuing requests to content-servers on behalf of the end users by borrowing (spoofing) their identification i.e., the proxy server uses user IP addresses instead of their own; hence, insuring that all downstream functions that were previously put in place, such as shaping and filtering, still operate as expected. Unfortunately, by doing so, this has introduces a further problem, especially for the case of these new proxy-servers which are in fact implemented as clusters of servers fed, on client side, from load balancing functions. This way of organizing servers has become very popular because of all its advantages in terms of maintainability, availability and scaleability. Much more on load balancing over a cluster of servers can be found e.g., in a 'Redboook' by IBM published by the Austin, Texas center of the International Technical Support Organization (ITSO) and untitled "Load-Balancing Internet Servers" under the reference SG24-4993 on December 1997.

Therefore, in this case i.e., when the proxy-server is actually a cluster of servers (and in other similar situations where the proxy is not a single entity through which responses to all inbound traffic must return), spoofing the end user address in requests destined to remote content-servers cannot guarantee that responses will return to the particular proxy server, within the cluster of proxy severs, that originated the request. This is because, it is the end-user client address that has been used in lieu of the server address (for the reasons mentioned herein above).

This problem of the unpredictable return path to the originating individual proxy server in effect, foils the use of spoofing when the proxy-server is a cluster of servers. It would be highly desirable that both techniques (i.e., spoofing of the user address and proxy-servers implemented as a cluster of servers) be used simultaneously to implement a very effective solution for proxy-servers, a key component of all ISP and enterprise networks.

FIG. 1 illustrates prior art and discusses the problem solved by the invention when a proxy-server [100] to an ISP or enterprise network [110] is made of a cluster of individual servers comprising three servers [101], [102] and [103] in this particular example. Individual servers, within the cluster, are fed from a load balancer [120] aimed at dispatching the workload resulting from requests issued from the users (e.g., [111]) connected on the ISP/enterprise network [110]. Because this way of organizing a server is very effective and very flexible it is widely used to implement servers. Among the numerous advantages a cluster of servers fed through a load balancer offer, the possibility of upgrading server performances by adding extra individual servers any time to cope with the increase of the traffic on one hand and the redundancy provided by the multiplicity of servers and the load balancing function (which has always the freedom of dispatching workload only over those of the individual servers that are up and running at a given instant so as to allow a continuous availability to the end users) on the other hand, are key to explain the popularity gained by this way of organizing servers. However, when server is a proxy-server like [100], installed by the administrator of an ISP/enterprise network such as [110] in order to improve the response time to frequently accessed remote resources combined with the requirement of having to drastically control operational expenses (of which a significant contributor is the cost of the communications lines to access these remote resources in a remote content-server [130] over the Internet [140]) then, an individual server [103] (which is given the task of handling a request from a user [111] by the load balancer [120]) may have to access [150] a remote content-server [130] to be able to carry out user's request. A simple example of this is when a Web page is requested for the first time. It needs to be fetched once in the source remote content-server to become available in the proxy.

This does not pose any problem as long as the individual server i.e., [103] in this example, uses its own IP address {IP_server_103} to forward the request to the content-server which will respond to it directly with the requested information through the Internet. However, there is often the requirement that proxy-server be transparent i.e., act on behalf of the user [111] as if it were the user. In which case proxy is conditioned to forward the requests through the Internet using user IP address {IP_user_111} in lieu of its own address {IP server_103_}. This technique in which a device mimics the IP address of another party is referred to as 'spoofing' in the jargon of the Internet and IP networking. Spoofing, which is often highly desirable, helps to preserve transparency to improve the behavior of the network or just to keep it functioning at its optimal level of performances. As already mentioned earlier, on its way to the content-server, through the Internet, requests issued from a user or a group of users may have to be filtered and shaped based on their origin i.e., their IP address. If origin addresses are masked by a proxy-server these functions no longer work properly. Then, spoofing does not fit at all with proxy-servers organized as a cluster of servers since the obvious consequence of spoofing in this case is that the content-server [130] no longer knows to which individual server the response to a request must be returned [160]. Although proxy [100], as the compulsory gateway of network [110], is on the path towards the end user [111] to which the response is eventually due, the response may end up in another individual server (i.e., [101] or [102] in this example) which, not being the origin of the request will discard it. Thus, although the two techniques i.e., cluster of servers for scaleability and availability and spoofing for transparency should be used in combination they are incompatible.

SUMMARY OF THE INVENTION

A method and a system for granting invisibility to the compulsory gateway of an IP network comprising a proxy-server aimed at serving users on the IP network are disclosed. It is assumed that the proxy-server includes a plurality of individual servers and an inverse load balancer. Then, when individual servers have to access resources available on remote content-servers i.e., whenever the users cannot be served straight from the proxy-server the following is performed:

Firstly, upon issuing requests towards the remote content-servers from the individual servers through the inverse load balancer and in order to access transparently, on behalf of the users, the resources therein, a cross referencing is established of the individual servers versus the users in the inverse load balancer.

Secondly, upon obtaining responses for the users from the remote content-servers in the inverse load balancer retrieving the references of the individual servers corresponding to the users. Hence, the responses from the remote content-servers are steered to the referenced individual servers which can serve the users on the IP network transparently, on behalf of said content-servers, thus, insuring both-way transparency, that is to say "invisibility" to the proxy-server.

The advantage for the network administrator of the method and system of the invention is twofold. The user applications need not to be personalized whatsoever while using a compulsory clustered proxy-server a popular solution which provides for maintainability, availability and scaleability. Simultaneously, it provides transparency towards remote content-servers which can continue receiving requests on behalf of the users as if no proxy-server was in between. Thus, guaranteeing that all software and hardware put in place on the path to the content-servers still continue to operate alike at the same level of performances.

Thus, it is a broad object of the invention to grant invisibility to a proxy-server organized as a cluster of individual servers so as it is not only transparent to the outbound traffic originated by the users but also gains transparency, in the other direction i.e., for the inbound traffic, vis a vis the remote content-servers that are solicited whenever a user request cannot be honored from the proxy-server itself. Hence, getting transparency from both ends it becomes invisible in the network. Further advantages of the present invention will become apparent to the ones skilled in the art upon examination of the drawings and detailed description. It is intended that any additional advantages be incorporated herein.

DESCRIPTION OF THE PREFERRED EMBODIMENT

Figure 1:
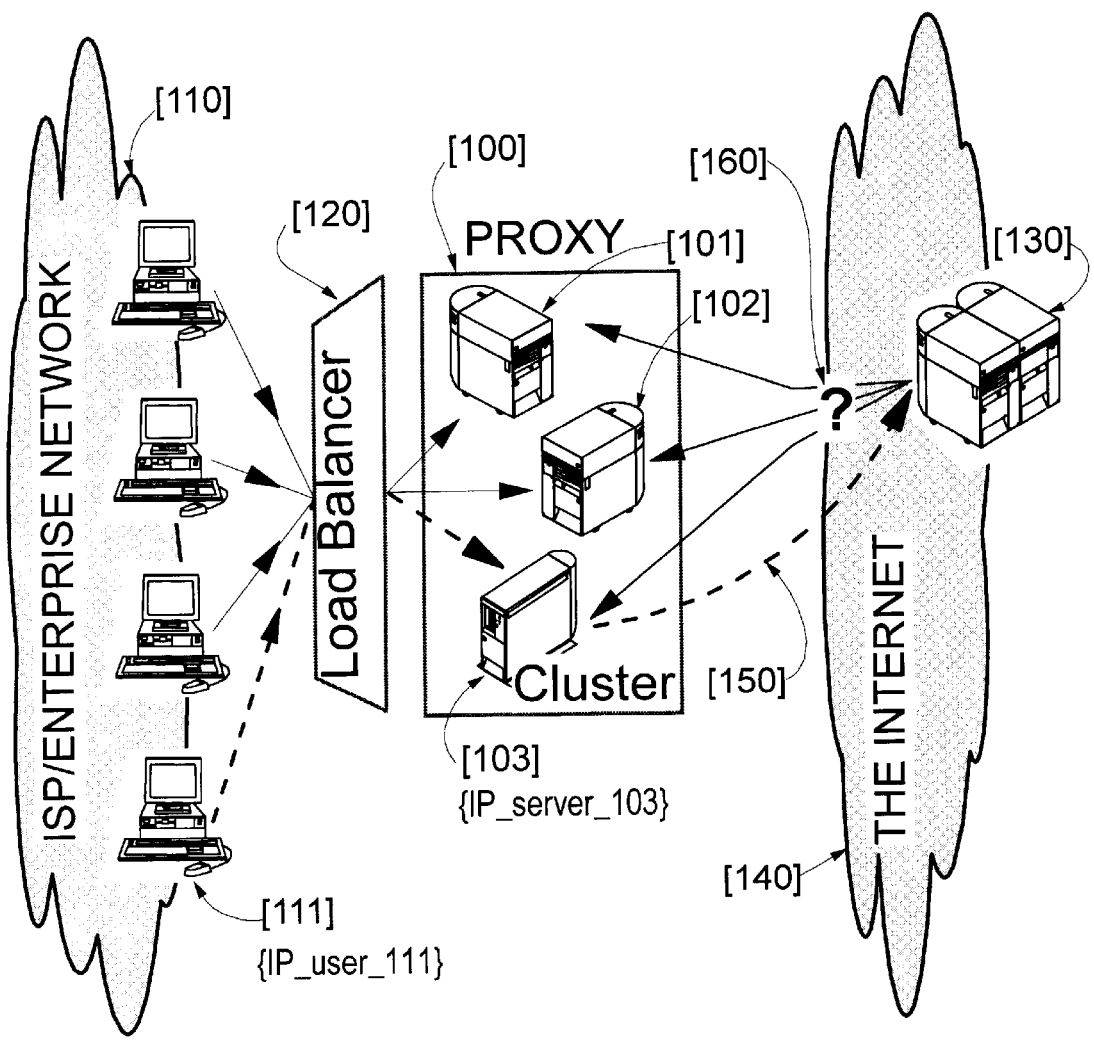
FIG. 1 depicts the problem encountered with the prior art when using a clustered proxy-server.
Figure 2:
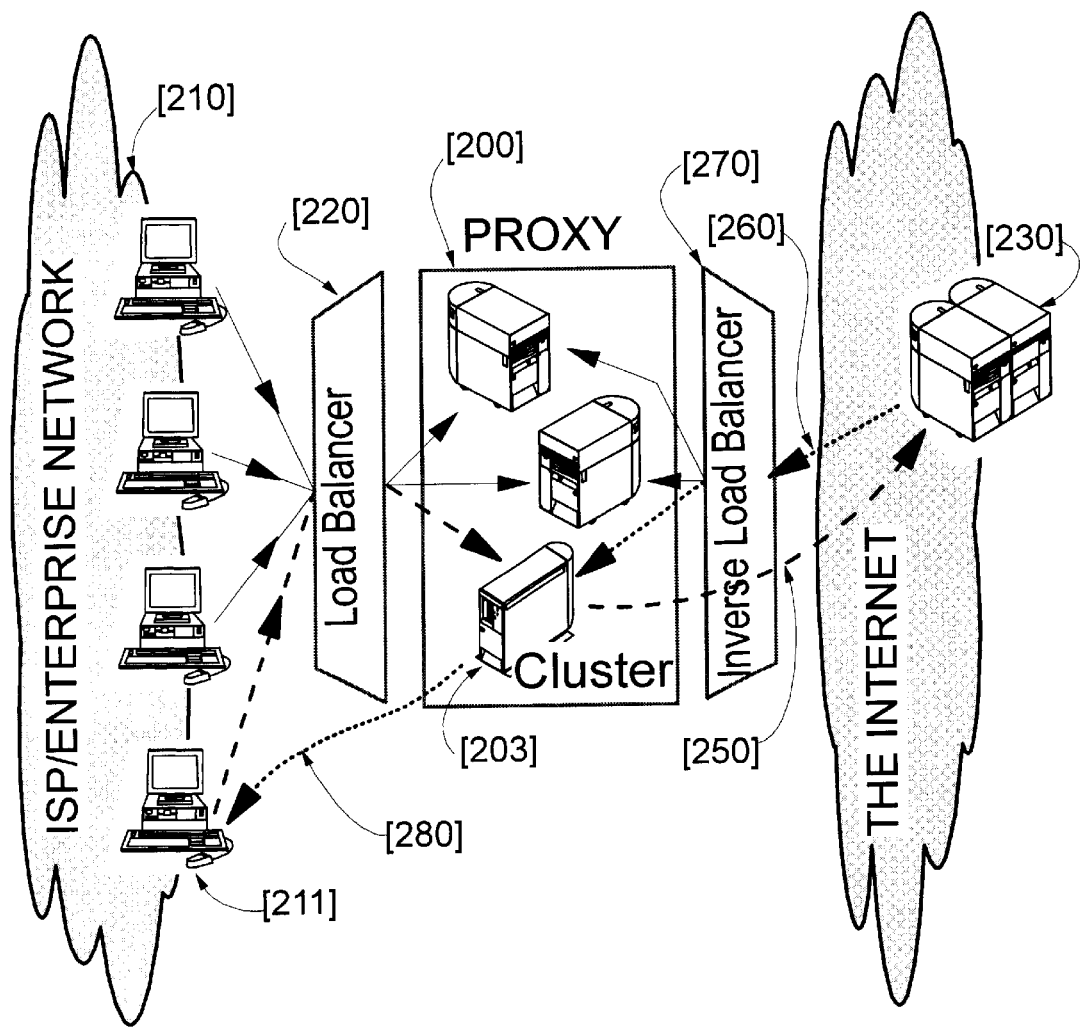
FIG. 2 introduces the invert load balancer per the invention.

FIG. 2 illustrates the principle of the invention. From the previous discussion about FIG. 1, it is now clear that a a key component is missing in proxy-servers, implemented under the form of a cluster of individual servers [200], at the gateway of an ISP/Enterprise network [210], and in all similar situations of a proxy function not confined to a single entity. When an individual server e.g. [203], part of the proxy-server [200], needs to access a remote resource from a content-server [230] in a transparent manner (using the user IP address of the origin of the request, or any address in lieu of its own address), one must remember which particular individual server of the cluster the load balancer [220] has assigned when handling a request from a user [211]. This component [270] (referred to as Inverse Load Balancer in the following) must keep track of which particular server is in charge, in case a remote resource needs to be accessed to satisfy a particular user request. Then, when the request [250] is issued from the proxy-server, towards the content-server [230] holding the resource of interest, a record is created, which will be used by the Inverse Load Balancer [270] on return of the response [260], to steer it to the right individual server i.e., [203] in this example, within the clustered proxy-server [200], so the end user [211] having initiated the request in a first place is eventually served [280]. Because the scheme of the invention makes the return path to a proxy-server transparent this obviously works under the assumption that the Inverse Load Balancer [270] is the compulsory entry point to the ISP/Enterprise network [210] so that it intercepts all inbound traffic.

Figure 3:
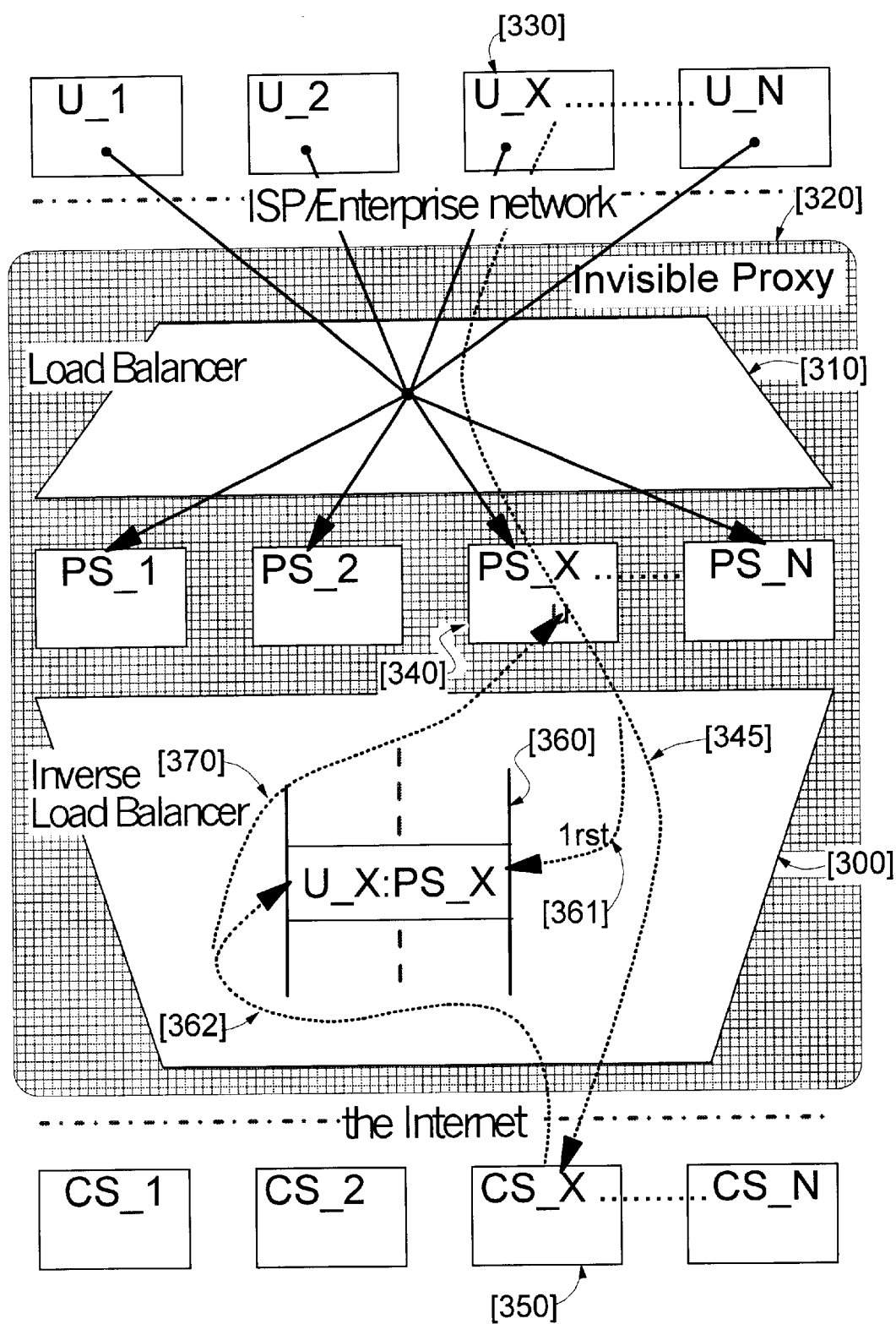
FIG. 3 presents details of the invert load balancer functions.

FIG. 3 depicts with more details the invention focusing on the inverse load balancer [300] which, in conjunction with a regular load balancer [310] known in the art, provides that a proxy-server [320] built as a cluster of individual servers (PS_1 to PS_N), becomes invisible i.e., is not only transparent to the users (U_1 to U_N), but is transparent as well to the content-servers (CS_1 to CS_N), that need to be accessed through the Internet when resources requested by an end user e.g., U_X [330] are not available within the proxy-server. Thus, when a user issues a request, it is caught by the load balancer [310] which dispatches it to one of the individual servers of the cluster of servers e.g., PS_X [340]. When the request cannot be satisfied locally, a remote content-server hosting the requested information or resource (e.g., CS_X [350] in this example), must be accessed [345] through the Internet on behalf of the user having initiated the request [330] (i.e., using a user unique IP address). Thus, maintaining forward transparency of the user requests. When this is done for the first time (at the beginning of a session), an entry is made or updated [361] in a cross reference table [360] of the inverse load balancer [300] to keep track of the correspondence between users U_X and individual servers PS_X in charge of processing their requests. Therefore, when remote content-server [350] delivers its response (having U_X [330] as target) the interrogation [362] of the cross reference table [360], within the inverse load balancer [370], provides which one of the individual servers (PS_1 to PS_N) has handled the request on behalf of the user [330] so that it is this individual server (i.e., PS_X [340] in the example), which actually gets the content-server response. At this point the individual server [340] can complete the user request as if the request had been processed locally and, moreover, may decide (if appropriate) to retain newly fetched information (since it is the main purpose of a proxy function like [320] to not require multiple accesses of identical remote resources). Thus, the invention renders a proxy function invisible even if implemented under the form of a cluster of individual servers. Neither the users (such as U_X [330]) nor the content-servers (like CS_X [350]), nor all the hardware and software put between them, are aware of the existence of such an invisible proxy-server.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for providing invisibility to a compulsory gateway of an IP network, the gateway comprising a proxy-server, the proxy-server including a plurality of individual servers and an inverse load balancer, said method comprising the steps of:

a) receiving at one individual server of said plurality of individual servers of said proxy-server, a request from a user, said request comprising a user identifier identifying said user as the source of the request and a remote content server identifier identifying a remote content server as the target of the request;

b) creating a cross reference of said user identifier and an individual server identifier identifying said one individual server, said cross reference for use by said inverse load balancer for directing responses from remote content servers to a requesting individual server of said plurality of individual servers of said proxy-server; and, c) directing said request to said remote content-server when said request cannot be served by said proxy-server, said directed request comprising said user identifier as the source of the request rather than said individual server identifier whereby said one individual server is invisible to said user and said remote content-server.

2. The method according to claim 1 wherein said cross reference is stored in a table.

3. The method according to claim 1 wherein said content-servers are accessed from said individual servers of said proxy-server through any one of a private IP network, the World Wide Web or a public IP network.

4. The method according to claim 1 comprising the further steps of:

said inverse load balancer receiving a response to said request from said remote content server, said response comprising said user identifier as the target of the response, said response further comprising said remote content server identifier as the source of the response;

said inverse load balancer retrieving said cross reference of said user identifier and said individual server identifier;

said inverse load balancer providing said response to said one individual server identified by said cross reference;

determining said user as the destination for said response; and, directing said response to said user, said directed response comprising said remote content server identifier as the source of the response rather than said individual server identifier whereby said one individual server is invisible to said user and said remote content-server.

5. A method for providing invisibility to a compulsory gateway of an IP network, the gateway comprising a proxy-server, the proxy-server including a plurality of individual servers and an inverse load balancer, said method comprising the steps of:

a) said inverse load balancer receiving a response from a remote content server, said response comprising a user identifier identifying a user as the target of the response, said response further comprising a remote content server identifier identifying the remote content server as the source of the response;

b) said inverse load balancer retrieving a cross reference of said user identifier and an individual server identifier identifying one individual server of said plurality of individual servers of said proxy-server;

c) said inverse load balancer providing said response to said one individual server identified by said cross reference;

d) determining said user as the destination for said response; and, e) directing said response to said user, said directed response comprising said remote content server identifier as the source of the response rather than said individual server identifier whereby said one individual server is invisible to said user and said remote content-server.

6. The method according to claim 5 including the further step of said inverse load balancer accessing storage to retrieve said cross reference.

7. The method according to claim 5 wherein said content-server is accessed from said individual servers of said proxy-server through any one of a private IP network, the World Wide Web or a public IP network.

8. The method according to claim 5 including the further step of storing content of said response at said one individual server for further use.

9. The method according to claim 5, the method further comprising:

receiving at said one individual server, a request for said response from said user said request comprising said user identifier identifying said user as the source of the request and said remote content server identifier;

creating said cross reference of said user identifier and said individual server identifier, said cross reference for use by said inverse load balance for directing responses from remote content server to a requesting individual server of said plurality of individual servers of said proxy-server; and, directing said request to said remote content-server when said request cannot be served by said proxy-server, said directed request comprising said user identifier as the source of the request rather than said individual server identifier whereby said one individual server is invisible to said user and said remote content-server.

10. A computer program product comprising a computer useable medium comprising computer readable program code therein for providing invisibility to a compulsory gateway of an IP network, the gateway comprising a proxy-server, the proxy server including a plurality of individual servers and an inverse load balancer, said computer readable program code in said computer program product comprising:

a) computer readable program code for receiving at one individual server of said plurality of individual servers of said proxy-server, a request from a user, said request comprising a user identifier identifying said user as the source of the request and a remote content server identifier identifying a remote content server as the target of the request;

b) computer readable program code for creating a cross reference of said user identifier and an individual server identifier identifying said one individual server, said cross reference for use by said inverse load balancer for directing responses from remote content servers to a requesting individual server of said plurality of individual servers of said proxy-server; and, c) computer readable program code for directing said request to said remote content-server when said request cannot be served by said proxy-server, said directed request comprising said user identifier as the source of the request rather than said individual server identifier whereby said one individual server is invisible to said user and said remote content-server.

11. The computer program product according to claim 10 wherein said cross reference is stored in a table.

12. The computer program product according to claim 10 wherein said content-servers are accessed from said individual servers of said proxy-server through any one of a private IP network, the World Wide Web or a public IP network.

13. The computer program product according to claim 10 further comprising:

computer readable program code for said inverse load balancer receiving a response to said request from said remote content server, said response comprising said user identifier as the target of the response, said response further comprising said remote content server identifier as the source of the response;

computer readable program code for said inverse load balancer retrieving said cross reference of said user identifier and said individual server identifier;

computer readable program code for said inverse load balancer providing said response to said one individual server identified by said cross reference;

computer readable program code for determining said user as the destination for said response; and, computer readable program code for directing said response to said user, said directed response comprising said remote content server identifier as the source of the response rather than said individual server identifier whereby said one individual server is invisible to said user and said remote content-server.

14. A computer program product comprising a computer useable medium having computer readable program code therein for providing invisibility to a compulsory gateway of an IP network, the gateway comprising a proxy-server, the proxy-server including a plurality of individual servers and an inverse load balancer, said computer readable program code in said computer program product comprising:

a) computer readable program code for said inverse load balancer receiving a response from a remote content server, said response comprising a user identifier identifying a user as the target of the response, said response further comprising a remote content server identifier identifying the remote content server as the source of the response;

b) computer readable program code for said inverse load balancer retrieving a cross reference of said user identifier and an individual server identifier identifying said one individual server;

c) computer readable program code for said inverse load balancer providing said response to said one individual server identified by said cross reference;

d) computer readable program code for determining said user as the destination for said response; and, e) computer readable program code for directing said response to said user, said directed response comprising said remote content server identifier as the source of the response rather than said individual server identifier whereby said one individual server is invisible to said user and said remote content-server.

15. The computer program product according to claim 14 further comprising computer readable program code for said inverse load balancer accessing storage to retrieve said cross reference.

16. The computer program product according to claim 14 wherein said content-server is accessed from said individual servers of said proxy-server through any one of a private IP network, the World Wide Web or a public IP network.

17. The computer program product according to claim 14 including the further step of storing content of said response at said one individual server for further use.

18. The computer program product according to claim 14, further comprising:

computer readable program code for receiving at said one individual server, a request for said response from said user said request comprising said user identifier identifying said user as the source of the request and said remote content server identifier;

computer readable program code for creating said cross reference of said user identifier and said individual server identifier; and, computer readable program code for directing said request to said remote content-server when said request cannot be served by said proxy-server, said directed request comprising said user identifier as the source of the request rather than said individual server identifier whereby said one individual server is invisible to said user and said remote content-server.

19. An apparatus for providing invisibility to a compulsory gateway of an IP network comprising:

a proxy-server including a plurality of individual servers and an inverse load balancer;

a) means for receiving at one individual server of said plurality of individual servers of said proxy-server, a request from a user, said request comprising a user identifier identifying said user as the source of the request and a remote content server identifier identifying a remote content server as the target of the request;

b) means for creating a cross reference of said user identifier and an individual server identifier identifying said one individual server, said cross reference for use by said inverse load balancer for directing responses from remote content servers to a requesting individual server of said plurality of individual servers of said proxy-server; and, c) means for directing said request to said remote content-server when said request cannot be served by said proxy-server, said directed request comprising said user identifier as the source of the request rather than said individual server identifier whereby said one individual server is invisible to said user and said remote content-server.

20. The apparatus according to claim 19 wherein said cross reference comprises a table.

21. The apparatus according to claim 19 wherein said content-servers are accessed from said individual servers of said proxy-server through any one of a private IP network, the World Wide Web or a public IP network.

22. The apparatus according to claim 19 further comprising:

means for said inverse load balancer receiving a response to said request from said remote content server, said response comprising said user identifier as the target of the response, said response further comprising said remote content server identifier as the source of the response;

means for said inverse load balancer retrieving said cross reference of said user identifier and said individual server identifier;

means for said inverse load balancer providing said response to said one individual server identified by said cross reference;

means for determining said user as the destination for said response; and, means for directing said response to said user, said directed response comprising said remote content server identifier as the source of the response rather than said individual server identifier whereby said one individual server is invisible to said user and said remote content-server.

23. An apparatus for providing invisibility to a compulsory gateway of an IP network, the gateway comprising:

a proxy-server, the proxy server including a plurality of individual servers and an inverse load balancer;

means for said inverse load balancer receiving a response from a remote content server, said response comprising a user identifier identifying a user as the target of the response, said response further comprising a remote content server identifier identifying the remote content server as the source of the response;

means for said inverse load balancer retrieving a cross reference of said user identifier and an individual server identifier identifying one individual server of said plurality of individual servers of said proxy-server;

means for said inverse load balancer providing said response to said one individual server identified by said cross reference;

means for determining said user as the destination for said response; and, means for directing said response to said user, said directed response comprising said remote content server identifier as the source of the response rather than said individual server identifier whereby said one individual server is invisible to said user and said remote content-server.

24. The apparatus according to claim 23 wherein said means for determining further comprising means for said inverse load balancer accessing storage to retrieve said cross reference.

25. The apparatus according to claim 23 wherein said content-server is accessed from said individual servers of said proxy-server through any one of a private IP network, the World Wide Web or a public IP network.

26. The apparatus according to claim 23 further comprising means for storing content of said response at said individual server for further use.

27. The apparatus according to claim 23, further comprising:

means for receiving at said one individual server, a request for said response from said user said request comprising said user identifier identifying said user as the source of the request and said remote content server identifier;

means for creating said cross reference of said user identifier and said individual server identifier, said cross reference for use by said inverse load balancer for directing responses from remote content servers to a requesting individual server of said plurality of individual servers of said proxy-server; and, means for directing said request to said remote content-server when said request cannot be served by said proxy-server, said directed request comprising said user identifier as the source of the request rather than said individual server identifier whereby said one individual server is invisible to said user and said remote content-server.

28. An apparatus for providing invisibility to a compulsory gateway of an IP network, the gateway comprising:

a proxy-server, the proxy-server including a plurality of individual servers and an inverse load balancer;

one individual server of said plurality of individual servers of said proxy-server receiving a request from a user, said request comprising a user identifier identifying said user as the source of the request and a remote content server identifier identifying a remote content server as the target of the request;

said inverse load balancer creating a cross reference of said user identifier and an individual server identifier identifying said one individual server, said cross reference for use by said inverse load balancer for directing responses from remote content servers to a requesting individual server of said plurality of individual servers of said proxy-server; and, said one individual server directing said request to said remote content-server when said request cannot be served by said proxy-server, said directed request comprising said user identifier as the source of the request rather than said individual server identifier whereby said one individual server is invisible to said user and said remote content-server.

29. The apparatus according to claim 28 further comprising:

said gateway receiving a response to said request from said remote content server, said response comprising said user identifier as the target of the response, said response further comprising said remote content server identifier as the source of the response;

said inverse load balancer retrieving said cross reference of said user identifier and said individual server identifier;

said inverse load balancer providing said response to said one individual server identified by said cross reference;

said one individual server determining said user as the destination for said response; and, said one individual server directing said response to said user, said directed response comprising said remote content server identifier as the source of the response rather than said individual server identifier whereby said one individual server is invisible to said user and said remote content-server.

30. An apparatus for providing invisibility to a compulsory gateway of an IP network, the gateway comprising:

a proxy-server, the proxy-server including a plurality of individual servers and an inverse load balancer;

one individual server of said plurality of individual servers of said proxy-server receiving a response from a remote content server, said response comprising a user identifier identifying a user as the target of the response, said response further comprising a remote content server identifier identifying the remote content server as the source of the response;

said inverse load balancer retrieving a cross reference of said user identifier and an individual server identifier identifying said one individual server;

said inverse load balancer providing said response to said one individual server identified by said cross reference;

said gateway determining said user as the destination for said response; and, said gateway further directing said response to said user, said directed response comprising said remote content server identifier as the source of the response rather than said individual server identifier whereby said one individual server is invisible to said user and said remote content-server.

31. The apparatus according to claim 30, further comprising:

said one individual server receiving a request for said response from said user said request comprising said user identifier identifying said user as the source of the request and said remote content server identifier as the target of the request;

said gateway creating said cross reference of said one of said user identifier and said individual server identifier, said cross reference for use by said inverse load balancer for directing responses from remote content servers to a requesting individual server of said plurality of individual servers of said proxy-server; and, said one individual server directing said request to said remote content-server when said request cannot be served by said proxy-server, said directed request comprising said user identifier as the source of the request rather than said individual server identifier whereby said one individual server is invisible to said user and said remote content-server.

* * * * *